No. 694,999. Patented Mar. 11, 1902.
C. P. E. SCHNEIDER.
DYNAMO ELECTRIC MACHINE.
(Application filed Oct. 11, 1901.)

(No Model.) 10 Sheets—Sheet 1.

Witnesses: Inventor:
Charles P. E. Schneider

No. 694,999. Patented Mar. 11, 1902.
C. P. E. SCHNEIDER.
DYNAMO ELECTRIC MACHINE.
(Application filed Oct. 11, 1901.)
(No Model.) 10 Sheets—Sheet 2.

No. 694,999. Patented Mar. 11, 1902.
C. P. E. SCHNEIDER.
DYNAMO ELECTRIC MACHINE.
(Application filed Oct. 11, 1901.)
(No Model.) 10 Sheets—Sheet 4.

No. 694,999. Patented Mar. 11, 1902.
C. P. E. SCHNEIDER.
DYNAMO ELECTRIC MACHINE.
(Application filed Oct. 11, 1901.)

(No Model.) 10 Sheets—Sheet 5.

Witnesses: Inventor:
Charles P. E. Schneider
his atty.

No. 694,999. Patented Mar. 11, 1902.
C. P. E. SCHNEIDER.
DYNAMO ELECTRIC MACHINE.
(Application filed Oct. 11, 1901.)
(No Model.) 10 Sheets—Sheet 6.

No. 694,999. Patented Mar. 11, 1902.
C. P. E. SCHNEIDER.
DYNAMO ELECTRIC MACHINE.
(Application filed Oct. 11, 1901.)

(No Model.) 10 Sheets—Sheet 7.

Witnesses: Inventor;
Charles P. E. Schneider

No. 694,999. Patented Mar. 11, 1902.
C. P. E. SCHNEIDER.
DYNAMO ELECTRIC MACHINE.
(Application filed Oct. 11, 1901.)

(No Model.) 10 Sheets—Sheet 9.

UNITED STATES PATENT OFFICE.

CHARLES PROSPER EUGÈNE SCHNEIDER, OF LE CREUSOT, FRANCE.

DYNAMO-ELECTRIC MACHINE.

SPECIFICATION forming part of Letters Patent No. 694,999, dated March 11, 1902.

Application filed October 11, 1901. Serial No. 78,310. (No model.)

*To all whom it may concern:*

Be it known that I, CHARLES PROSPER EUGÈNE SCHNEIDER, a resident of Creusot, Saône-et-Loire, France, have invented a new and useful Improvement in Dynamo-Electric Machines, which invention is fully set forth in the following specification.

This invention relates to improvements in dynamo-electric machines for the generation or use of either continuous or alternating currents, which improvements are more particularly applicable to the toothed armature type—i. e., to armatures formed with peripheral grooves in which are lodged the armature-coils constituted either of wire convolutions or of metal bars.

In the accompanying drawings, Fig. 8 is a longitudinal sectional elevation, and Fig. 9 a transverse section, part in front of a coil and part between two coils, of another embodiment of my invention. Fig. 15 is a longitudinal section on lines O P and Q R of Fig. 16, and Fig. 16 a plan view, illustrating an embodiment of my invention as applied to a continuous-current machine. Figs. 6ª, 8ª, 9ª, 10ª, 14ª, 15ª, and 17ª are detail views showing the means for securing the caps of Figs. 6, 8, 9, 10, 14, 15, and 17, respectively, to the armatures.

Figure 1:
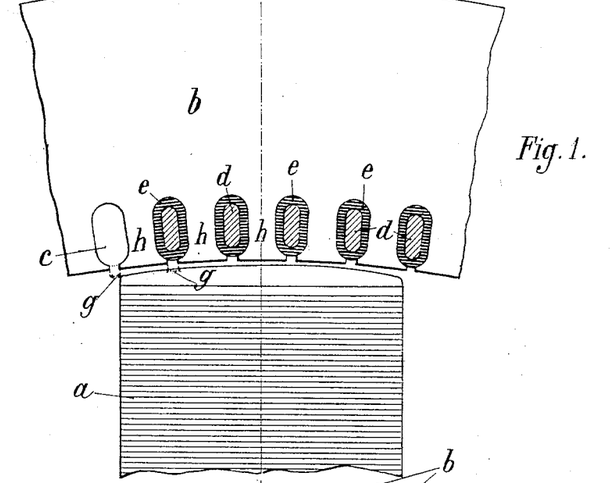
Figures 1 and 2 represent, respectively in elevation and in transverse section with one of the coils in elevation, a common construction of toothed armature.
Figure 2:
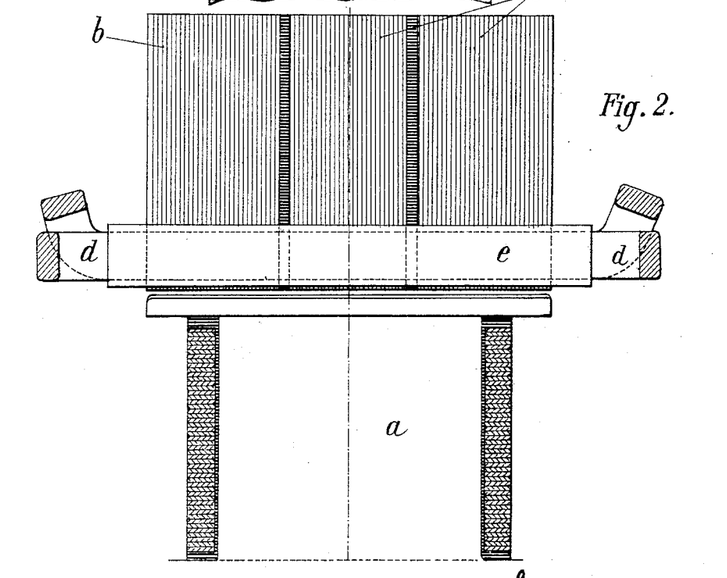

Toothed armatures have usually hitherto been constructed substantially as shown in elevation and transverse section in Figs. 1 and 2 of the accompanying drawings. In these figures $a$ is a pole of the field-magnet. The armature, which is laminated or constructed of thin juxtaposed plates $b$, is formed at its inner periphery with cavities or grooves $c$, separated from each other by plain or solid portions forming teeth $h$. In the said grooves are arranged coils $d$, consisting of metal bars or wire having an insulating-covering.

Figure 3:
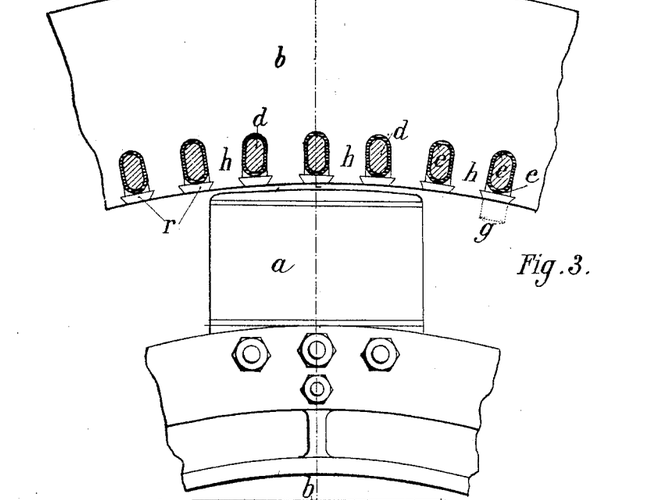
Figs. 3 and 4 are similar views of a construction of toothed armature which has heretofore been used.
Figure 4:
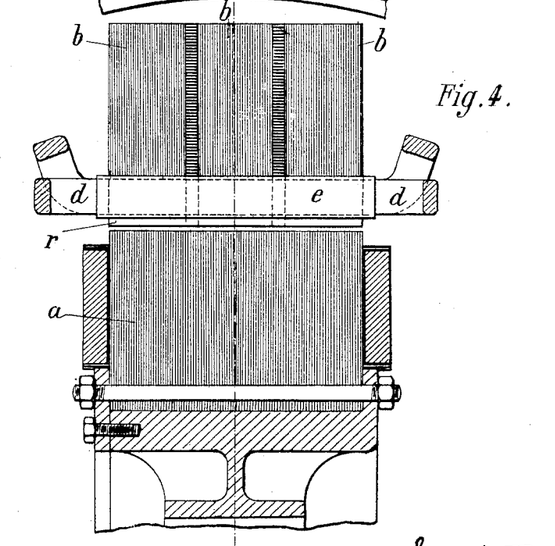

The importance of reducing as much as possible the magnetic resistance of the intermediate metal, and thus avoiding reduction in the surface of the latter, is well known. For this reason attempts have been made to reduce the space $g$ between the adjacent edges of the teeth. By leaving the intermediate metal with a large surface a certain economy in the weight of the copper required for the production of the magnetic flux may be realized, with a consequent simplification in the manufacture. By reducing the space $g$ the effect of the "Foucault" currents generated in the pole-pieces will be reduced, and the latter may therefore consist of plain iron instead of laminated iron—i. e., thin insulated juxtaposed sheets or plates—with the result of further economy in the manufacture. This arrangement, however, has the inconvenience of rendering it impossible to quickly remove and replace a damaged or deteriorated armature-coil. The winding is a long and costly operation, especially when high tensions are required, necessitating a great number of convolutions for the armature-coils, as this operation cannot be effected separately upon calibrated mandrels, but must be performed directly upon the armature itself by passing the wire of the coil $d$ through the insulating-tube $e$ previously introduced into the recess of groove $c$. In order to avoid this inconvenience, slots or grooves have been made entirely open, so that the space or gap $g$ between the teeth is large enough to permit the expeditious removal and replacing of the armature-coil in case of accident or injury. The armature-coils may be wound separately upon appropriately-formed mandrels by mechanical means. This arrangement is shown in Figs. 3 and 4 in elevation and transverse section, respectively, the latter being taken through the axis of one of the grooves or slots. The armature-coils $e\ d$ are retained in their slots or grooves $c$ by means of slides or keys $r$, formed of wood, vulcanite, or other insulating material and adapted to be readily withdrawn. This arrangement is objectionable by reason of its causing a considerable reduction in the intervening metal composing the teeth, and therefore an increase of the magnetic reluctance or resistance and consequent cost of copper used for the production of the total magnetic flux. Moreover, it will be necessary to provide laminated poles $a$, as shown in Fig. 4, whereby the difficulties of the manufacture and the cost will be increased.

The apparatus constructed according to this invention presents none of the inconveniences of the aforesaid known systems, while possessing the advantages of both of them.

My said invention consists, in principle, in the method of securing the armature-coils in slots or spaces of sufficient width to permit their easy introduction and removal by means of removable overlapping or capping pieces secured by means of screws to the armature-teeth. These overlapping pieces are constructed of divided or fractional magnetic material, such as juxtaposed magnetic laminated plates. From the following description it will be seen that the said capping-piece, which forms a compact single part easily manipulated, may comprise one or more longitudinally-disposed insulated magnetic elements. The use of these capping-pieces affords the advantage of not reducing the surface of the intermediate metal, while reducing the production or effect of the Foucault currents in the pole-pieces. Moreover, the removal of the coils $d$ is facilitated without the use of auxiliary means, such as the wedges or keys $r$, Figs. 3 and 4.

I have by way of example shown in the accompanying drawings several forms of construction of my invention.

Figure 5:
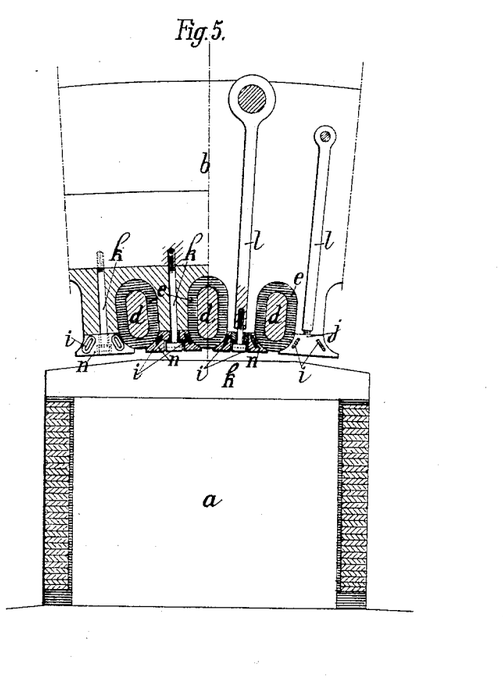
Fig. 5 is a longitudinal sectional elevation.

Fig. 5 shows in sectional elevation (the section being taken parallel with the laminated-iron plates and transversely to the armature-coils) a portion of the toothed armature $b$, provided with my devices for capping the armature-coils facing the pole $a$.

Figures 6, 6A:
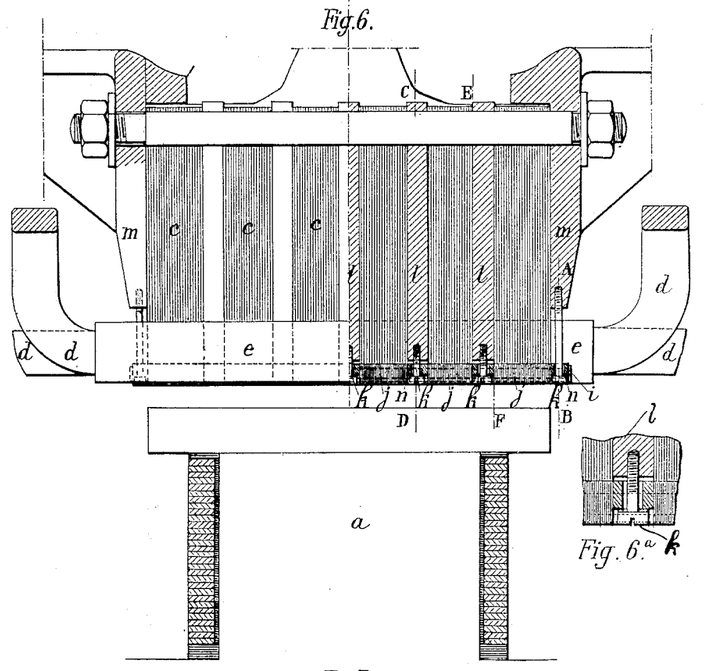
Fig. 6, a transverse sectional elevation on the line G H of Fig. 7, and Fig. 7 an inverted plan view, of one of the cap-pieces of a construction embodying my invention.
Figure 7:
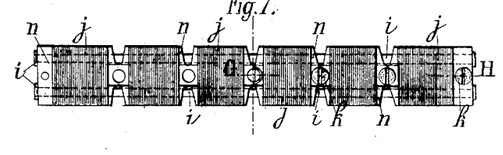

Fig. 6 is a transverse sectional elevation corresponding to Fig. 5 and showing the capping-piece at the right-hand side in section on the line G H of Fig. 7, and at the left-hand side a simple section through the laminated plates $c$ of the armature, while the bobbin $d$, with its insulating-sheath $e$, is in elevation.

Fig. 7 shows an inverted plan of one of the capping-pieces.

The armature-coils $d\ e$ are lodged in grooves or slots, each having an opening as large as the coil and its sheath, and said coils are retained in position by overlapping or capping pieces constructed in the following manner, viz: Magnetic laminated plates $j$, with projecting wings, are mounted side by side upon rods $i$, of non-magnetic material, in such a manner that the whole forms a bar comprising several series of blocks or sections composed of small segments, said blocks or sections being separated by distance-pieces $n$, also of non-magnetic material. A capping-piece so constructed is shown in the various figures from 5 to 13.

Figs. 5 and 6 show the capping-pieces firmly secured to the teeth of the armature by means of screws $k$, screwed into separating-pieces $l$ between the laminated blocks $c$ and at the ends in cheeks $m$ of the cast-iron frame of the armature.

Figures 8, 8A:
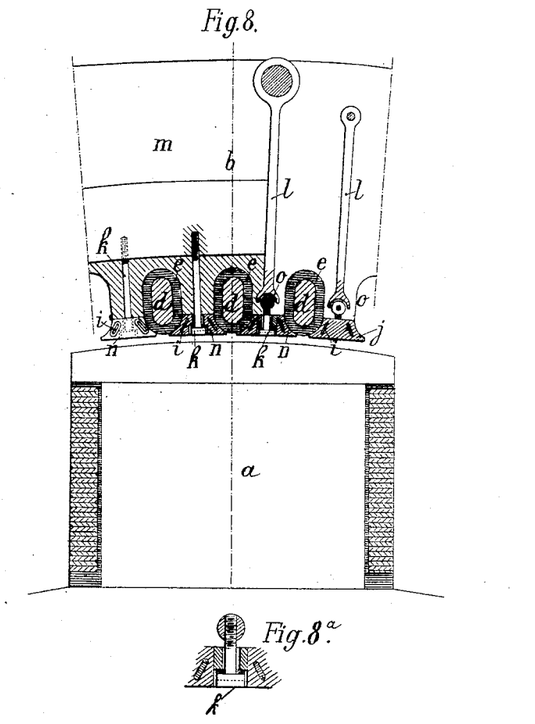
Figure 9:
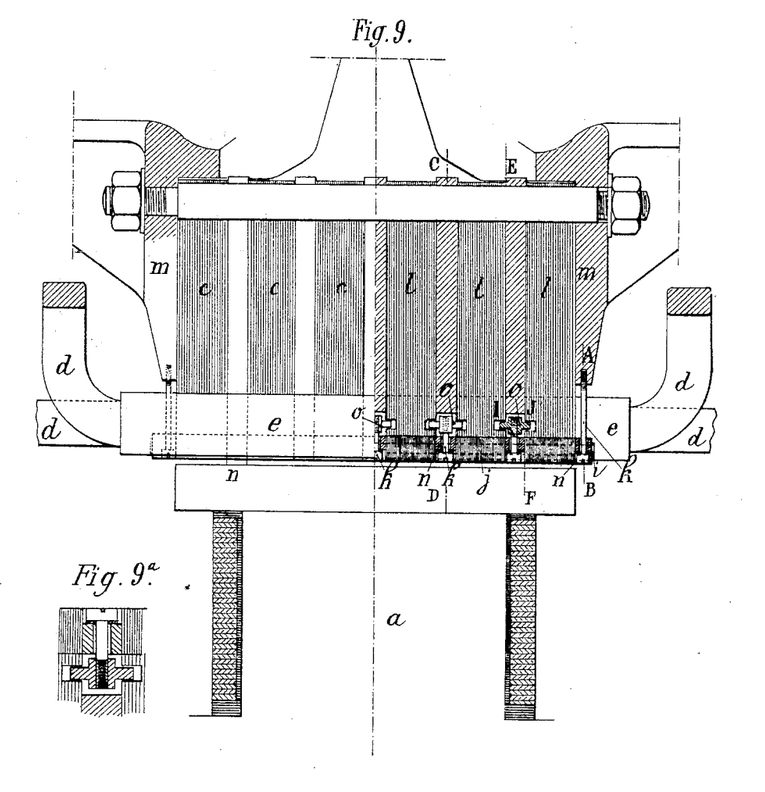
Figure 10:
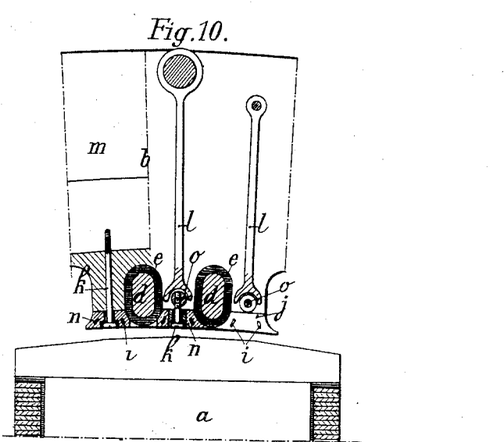
Fig. 10 is a longitudinal sectional elevation.
Figures 10A, 11, 12, 13:
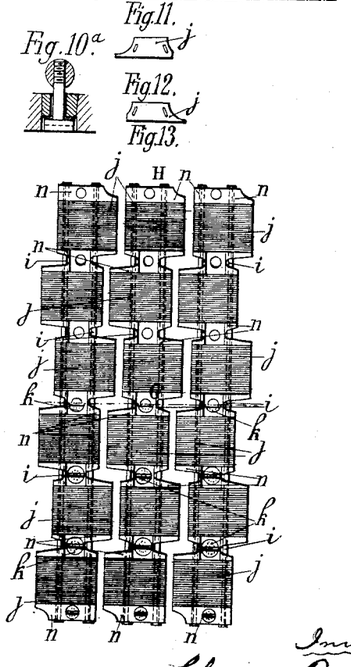
Figs. 11 and 12 are detail views.
Fig. 13 is an inverted plan, of the several cap-pieces of another construction embodying my invention.

Figs. 8 and 9 show a modified arrangement of devices for fixing the capping-pieces. Instead of fixing these pieces by screws inserted in the separating-pieces $l$, cross-heads or transverse pieces $o$ of a special form are arranged with sufficient play in recesses in the laminated plates $c$, and thus serve as nuts for the screws $k$. The ends of the capping-pieces are fixed in the same manner as in the previously-described arrangement.

Figs. 10, 11, 12, and 13 show details of a further modification of the magnetic sectional capping-pieces, which I term an "alternate" or "lozenge-shaped" arrangement. The blocks and the separating-pieces are arranged alternately, projecting and retreating relatively to the longitudinal center line or axis of the capping-piece in such a manner that the projecting parts of the one fit into the recessed parts of the other. The successive blocks of the capping-pieces present alternately the appearance shown at Figs. 11 and 12. In consequence of the kind of "break-joint" effect resulting from this arrangement I obtain the advantage of a continuity of the laminated plates at the periphery of the armature and of a reduction to a minimum of the Foucault currents generated in the pole-pieces $a$ by minimizing the variations in the magnetic flux without increasing the self-induction.

Figure 14:
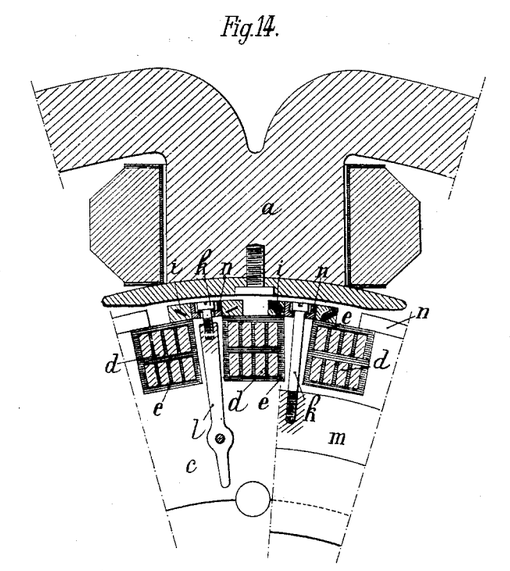
Fig. 14 is a transverse section on lines K L and M N of Fig. 15.
Figure 14A:
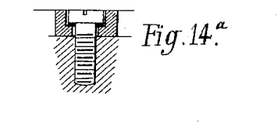
Figures 15, 15A:
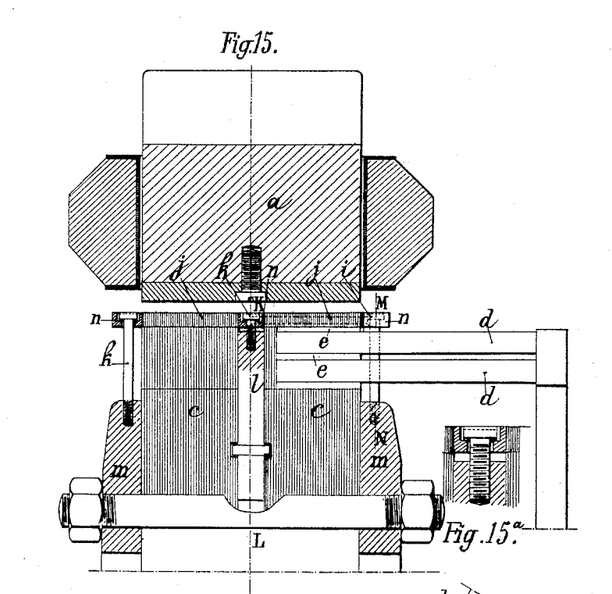
Figure 16:
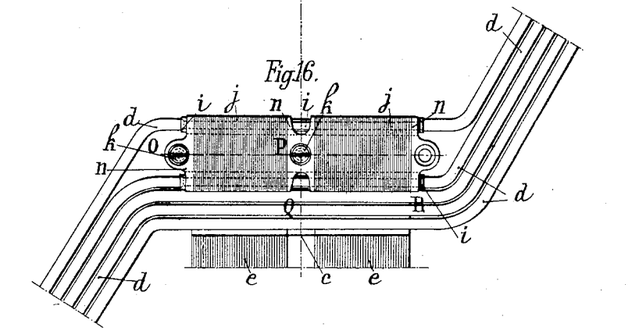

Figs. 14, 15, and 16 illustrate the application of my sectional magnetic capping-pieces with winged projections to the armatures of continuous-current machines, Fig. 14 being a transverse section taken on the lines K L and M N of Fig. 15, Fig. 15 being a longitudinal section taken on the lines O P and Q R of Fig. 16, and Fig. 16 being a plan. It will be seen from these figures that the width of the armature-coils may be very great, so that many coils may be lodged in one groove or slot, and I thereby effect an appreciable economy in the manufacture.

Figure 17:
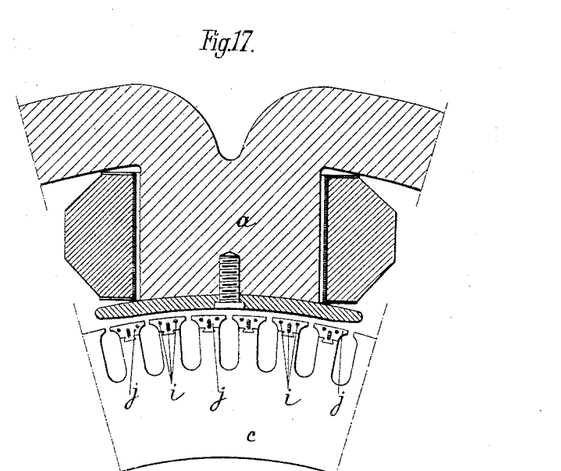
Fig. 17 is an elevation showing another way of securing the caps to the armature-teeth in accordance with my invention.
Figure 17A:
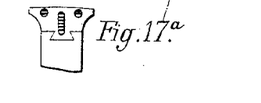

Fig. 17 shows another modification, in which the sectional capping-pieces are secured in dovetailed grooves upon the teeth of the armature by sliding them endwise into the said grooves. It is of course to be understood that the bars $l$, composed of the magnetic segments, together with the separating-pieces between the various blocks of each bar, are insulated and riveted or otherwise secured together, so as to form an absolutely rigid piece.

From the preceding description it will be obvious that by the use of these sectional capping-pieces, which form a compact whole capable of easy application, all the advantages of previously known systems are secured without their disadvantages—that is to say, first, these magnetic capping-pieces permit the easy and expeditious removal of one or more of the armature-coils and their immediate replacement by duplicate parts; second, while firmly securing the armature-coils in the grooves or slots the capping-pieces increase, by reason of their peculiar construction, the surface of the intervening iron, and thereby reduce the magnetic reluctance of the latter, thereby insuring economy through the reduction of the weight of the field-magnet copper-winding necessary for the total flux; third, there is a considerable reduction in the effect of the Foucault currents in the pole-pieces, and for this reason the latter may be of plain or solid iron instead of laminated plates, even if the grooves or slots in the armature are of great width; fourth, in case of accident—i.e., when the armature in an alternating-current machine or a continuous-current machine becomes overheated—it will be generally observed that not only the bobbins but also the teeth have been injured. Heretofore in order to make the repairs in such cases with the former arrangements of the magnetic armature it has been often necessary to dismount a considerable part of the machine.

The use of my magnetic capping-pieces permits the realization of the above-mentioned advantages and also allows the damaged portion of the magnetic part of the armature to be put in proper working order by simply replacing where necessary the capping-pieces.

It will be obvious that my improvements relating to the removable capping-pieces which serve as a magnetic covering and extensions of the teeth may also be applied to serrated frames of motors (receivers) for alternating currents, either mono or polyphase. The manner of fixing the capping-pieces on the teeth, the mechanical means for securing the parts, and the number of elements or blocks which constitute a capping piece or bar may also be varied. The height of the capping-piece with regard to the tooth, properly speaking, may also be varied, and the entire tooth may in certain special cases be replaced by a removable capping-piece.

What I claim, and desire to secure by Letters Patent of the United States, is—

1. In a dynamo-electric machine, a toothed armature, coils located in the grooves or spaces between the armature-teeth and adapted to be bodily removed therefrom and caps removably secured to the teeth of said armature each cap projecting beyond the edge of its tooth toward an adjacent tooth and over the coil in the groove between the teeth.

2. In a dynamo-electric machine a toothed armature having its teeth formed integral with the metal of the armature, coils located in the grooves or spaces between the armature-teeth and adapted to be bodily removed therefrom, and caps removably secured to the teeth of said armature each cap projecting beyond the edge of its tooth toward an adjacent tooth and over the coil in the groove between the teeth.

3. In a dynamo-electric machine, a toothed armature, and caps of divided magnetic material removably secured to the teeth, each cap projecting beyond the edge of its tooth toward an adjacent tooth.

4. In a dynamo-electric machine, a toothed armature, and caps of juxtaposed magnetic laminated plates removably secured to the teeth each cap projecting beyond the edge of its tooth toward an adjacent tooth.

5. In a dynamo-electric machine, a toothed armature, and caps removably secured to and projecting beyond the edges of said teeth toward adjacent teeth, said caps consisting of groups of juxtaposed magnetic laminated plates, distance-pieces of non-magnetic material interposed between the groups of plates and rods securing the plates and distance-pieces together.

6. In a dynamo-electric machine, a toothed armature, caps removably secured to the teeth of the armature each cap having a series of winged extensions alternately projecting from opposite sides thereof beyond the edge of its tooth and toward the caps on adjacent teeth and the caps on the several teeth being so arranged that the winged extensions on each cap project into the spaces between the winged projections on adjacent caps.

7. In a dynamo-electric machine, a toothed armature having its teeth formed integral with the metal of the armature, coils located in the grooves or spaces between the armature-teeth and adapted to be bodily removed therefrom, and caps of divided magnetic material removably secured to the teeth of said armature each cap projecting beyond the edges of its tooth toward adjacent teeth and over the coils in the grooves between the teeth.

In witness whereof I have hereunto set my hand in presence of two witnesses.

CHARLES PROSPER EUGÈNE SCHNEIDER.

Witnesses:
JEAN GAMET,
EDMOND BLAISE.